UNITED STATES PATENT OFFICE.

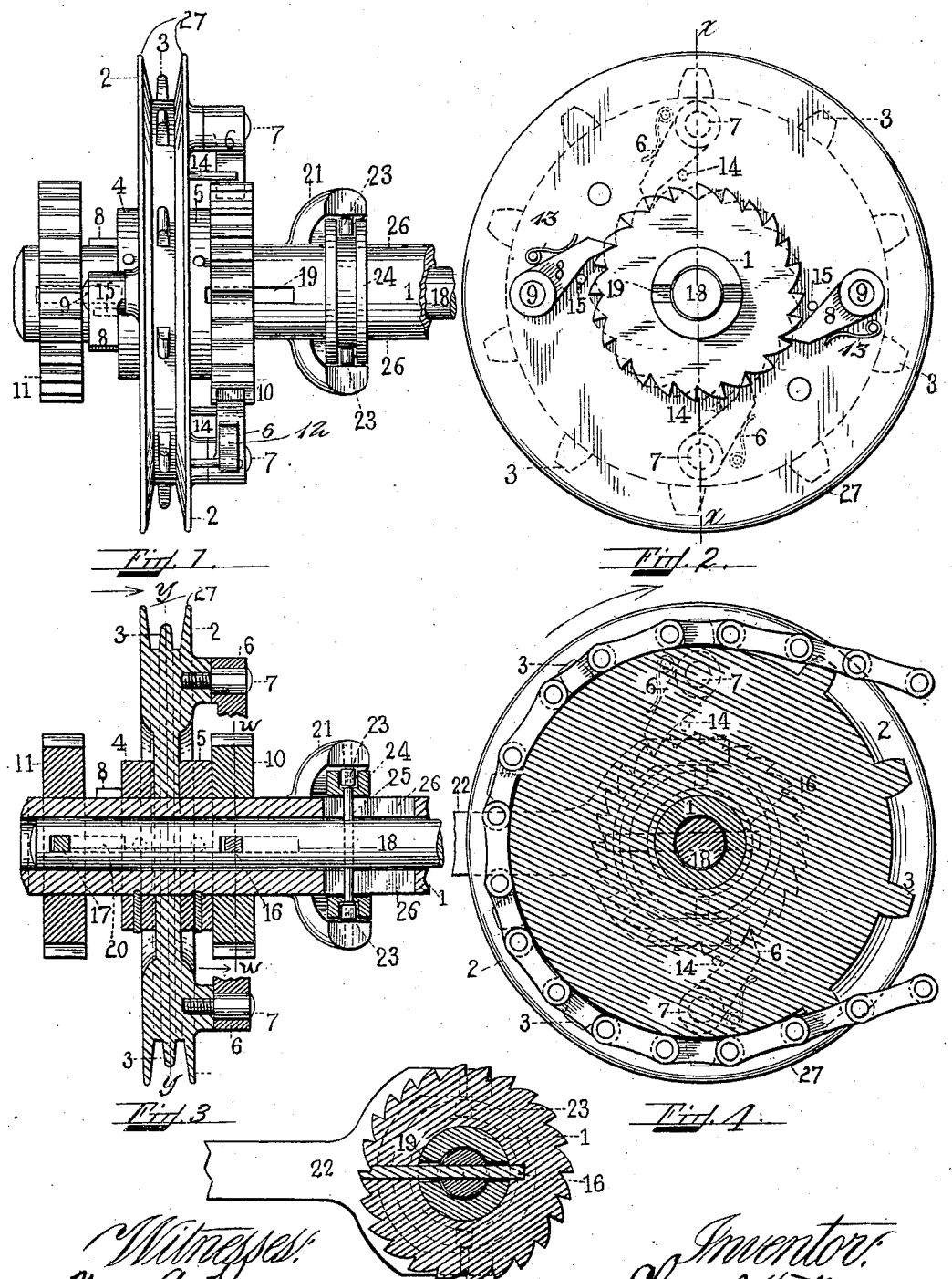

CHARLES B. HATFIELD, OF ROCHESTER, NEW YORK, ASSIGNOR TO HATFIELD MOTOR VEHICLE COMPANY, OF CORTLAND, NEW YORK, A CORPORATION OF NEW YORK.

POWER-TRANSMITTING MECHANISM.

No. 855,774.   Specification of Letters Patent.   Patented June 4, 1907.

Application filed March 26, 1906. Serial No. 308,046.

*To all whom it may concern:*

Be it known that I, CHARLES B. HATFIELD, a citizen of the United States, residing at Rochester, in the county of Monroe and State of New York, have invented certain new and useful Improvements in Power-Transmitting Mechanism; and I do hereby declare the following to be a full, clear, and exact description of the invention, such as will enable others skilled in the art to which it appertains to make and use the same.

The present invention relates to the driving gear of road vehicles or automobiles and it has for its object to obviate the use of divided shafts and differential gearing for the driving wheels.

As heretofore constructed, in order to provide for a differential movement of the driving wheels with relation to each other when the vehicle or automobile is rounding a curve, the shaft has been divided and connected by differential gearing which will permit the outside wheel to travel faster than the inside wheel. I propose to secure the relative differential movements of the driving wheels without the necessity of using the divided shaft and interposed differential gearing.

To the above ends the present invention consists of the improved driving gear for road vehicles which will be hereinafter described and claimed.

My invention is shown in the accompanying drawing, in which:—

Figure 1 shows in front elevation one of the driving sprocket wheels and its driving mechanism. Fig. 2 shows a side or end elevation of the sprocket wheel and one of its driving pawl and ratchet connections in full lines and another in dotted lines. Fig. 3 shows a vertical sectional view taken on the dotted line x—x, Fig. 2. Fig. 4 shows a sectional view taken on the dotted line y—y, Fig. 3, and including the sprocket chain which connects with the propelling wheel of the vehicle. Fig. 5 shows a section on the dotted line w—w, Fig. 3.

Similar reference characters will be used throughout the specification and drawing to designate corresponding parts.

In the drawing 1 is a hollow driving shaft rotated from any suitable source of power, as by a suitable engine. Upon this hollow shaft 1 is loosely mounted the sprocket or chain wheel 2, provided with the sprocket teeth 3, and which drives a chain, which in turn will drive the driven wheels of the vehicle.

As before stated, the sprocket wheel 2 is loosely mounted upon the hollow shaft 1 and is held thereon between fixed collars 4 and 5. The sprocket wheel 2 is provided upon one side with a pair of pawls 6 pivoted upon pins or studs 7 and upon its opposite side with a corresponding pair of pawls 8 pivoted upon pins or studs 9, the opposite pairs of pawls, as shown, extending in reverse directions, as clearly shown in Fig. 2 of the drawing. These pawls are arranged to engage the ratchet wheels 10 and 11 mounted upon opposite sides of the sprocket wheel 2 and spaced some distance apart, as clearly shown in Fig. 3 of the drawing, the arrangement being such that when one of the ratchet wheels is in position to be engaged by its co-operating set of pawls, the other of said ratchet wheels will be removed outside of the plane of action of its co-operating set of pawls, all as clearly shown in Figs. 1 and 3 of the drawing.

It will be understood that the teeth of the ratchet wheels 10 and 11 are pitched in opposite directions, the result being that when one of the ratchet wheels is driven in one direction, it will by the engagement of its co-operating set of pawls rotate the sprocket wheel in that direction, and correspondingly when the other ratchet wheel is moved into position to co-operate with its pawls and rotated in the reverse direction, it will impart a reverse movement to the sprocket wheel 2.

The pawls will be preferably held down in position to engage the respective ratchet wheels by means of springs 12 and 13, and their downward movement will be limited by means of pins 14 and 15, which pins will hold the pawls in their normal working position to be engaged by the ratchet teeth of the respective ratchet wheels.

The ratchet wheels 10 and 11 are secured by pins 16 and 17 to a rod 18 located within the hollow shaft 1 and arranged to be reciprocated within the hollow shaft 1 for the purpose of shifting the ratchet wheels 10 and 11, to move one of said ratchet wheels out of operative position with relation to its co-operating pawls, and the other into operative position with relation to its co-operating pawls and the reverse, and to permit such movement the hollow shaft 1 will be provided with slots 19 and 20, in which the pins 16 and 17 may move, all as clearly shown in the drawing.

For the purpose of moving the rod or shaft 18 to shift the ratchet wheels there will be provided a yoke 21 which may be operated by any suitable means, such as a lever 22, and which carries studs or rollers 23 engaging a grooved collar 24, the grooved collar 24 being connected to the shaft or rod 18 by means of a pin 25, and the hollow shaft 1 being slotted, as shown at 26, to permit the movement of the pin 25 for the purpose of shifting the shaft or rod 18 and the ratchet wheels 10 and 11.

The operation of the device is as follows:— Assuming that the parts are in the position shown in Figs. 1 and 2, a rotation of the hollow shaft 1 will impart a rotation to the shaft or rod 18 and the respective ratchet wheels 10 and 11, and, through the ratchet wheel 10 and the pawls 6, impart a rotary movement to the sprocket wheel 2 in one direction; but should it be desired to reverse the direction of rotation of the sprocket wheel 2 and the consequent direction of movement of the vehicle, the lever 22 will be rocked or moved to cause its yoke 21, through the collar 24, to move the shaft or rod 18 toward the right, thus moving the ratchet wheel 10 out of engagement with its pawls 6 and bringing the ratchet wheel 11 into engagement with the pawls 8, whereupon a reverse movement of the shaft 1 will impart a reverse movement to the sprocket wheel 2. When the vehicle is traveling around a curve, inasmuch as the driving sprocket wheel of the outer wheel as well as the inner wheel will be connected and driven by the pawl and ratchet mechanism shown, it will of course permit the outer driving wheel of the vehicle to overrun or travel faster than the movement of its driving ratchet wheel 10, the pawls in this event slipping over the teeth of the ratchet and thus the differential movement of the respective driving wheels of the vehicle will be secured without the necessity of dividing the driving shaft and interposing the usual differential gearing.

It will be understood that the mechanism shown in the drawing will be duplicated at each end of the shaft, there being a corresponding mechanism for each of the driving wheels of the vehicle.

For the purpose of preventing the sprocket chain from slipping off of the teeth of the sprocket wheel, I have provided the same with flanges, 27.

Having described my invention I claim as new and desire to protect by Letters Patent of the United States:—

1. In a power transmitting mechanism, the combination with a driving shaft, of a sprocket wheel loosely mounted thereon, reversely arranged driving connections operated by the driving shaft for operatively connecting the said shaft and the sprocket wheel to rotate said sprocket wheel from the driving shaft and means for shifting the driving connections to connect one of them with the sprocket wheel and to disconnect the other, substantially as described.

2. In a power transmitting mechanism, the combination with a driving shaft, of a sprocket wheel loosely mounted thereon, reversely arranged pawls mounted upon the opposite sides of the sprocket wheel, reversely arranged ratchet wheels slidingly mounted upon the driving shaft and co-operating with the pawls of the sprocket wheel and means for sliding said ratchet wheels longitudinally along the driving shaft whereby to connect one of said pawls and ratchet wheels and to disconnect the other set, substantially as described.

3. In a power transmitting mechanism, the combination with a hollow driving shaft, of a driven member loosely mounted thereon, reversely arranged pawls mounted upon the driven member, reversely arranged ratchet wheels slidingly mounted upon the hollow driving shaft, a shipping rod or shaft located within the hollow driving shaft and fixedly connected to the ratchet wheels and means for reciprocating the shipping rod or shaft to move the respective ratchet wheels into or out of engagement with their co-operating pawls, substantially as described.

In testimony whereof I affix my signature, in presence of two witnesses.

CHARLES B. HATFIELD.

Witnesses:
T. HART ANDERSON,
MAY A. KENNEY.